United States Patent [19]

Takahashi et al.

[11] 4,003,063
[45] Jan. 11, 1977

[54] POWER SUPPLY REGULATOR FOR AN AUTOMATIC EXPOSURE ADJUSTING CIRCUIT FOR USE IN A CAMERA

[75] Inventors: Akira Takahashi, Tokyo; Mikio Kobayashi, Kawasaki, both of Japan

[73] Assignee: Ricoh Co., Ltd., Tokyo, Japan

[22] Filed: Sept. 6, 1974

[21] Appl. No.: 503,689

[30] Foreign Application Priority Data

Oct. 26, 1973 Japan ............... 48-119817

[52] U.S. Cl. ............... 354/50; 354/60 R; 354/267
[51] Int. Cl.² ............... G03B 7/08
[58] Field of Search ........... 354/50, 51, 60 R, 60 E, 354/267, 238

[56] References Cited
UNITED STATES PATENTS

| | | | |
|---|---|---|---|
| 3,450,015 | 6/1969 | Reimann et al. | 354/267 X |
| 3,631,777 | 1/1972 | Mita | 354/51 |
| 3,646,859 | 3/1972 | Umemura | 354/60 E |
| 3,703,649 | 11/1972 | Maida | 354/50 X |
| 3,712,192 | 1/1973 | Ono et al. | 354/51 |
| 3,721,167 | 3/1973 | Ogiso | 354/60 R X |
| 3,728,946 | 4/1973 | Kuramoto et al. | 354/51 |
| 3,800,304 | 3/1974 | Taguchi et al. | 354/51 |
| 3,815,148 | 6/1974 | Ikeda et al. | 354/51 |
| 3,846,815 | 11/1974 | Kitai et al. | 354/50 |

*Primary Examiner*—L. T. Hix
*Assistant Examiner*—J. A. LaBarre
*Attorney, Agent, or Firm*—Cooper, Dunham, Clark, Griffin & Moran

[57] ABSTRACT

An automatic exposure adjusting circuit for use in a camera which permits the power to be supplied to several groups of circuits having different operation initiating and terminating times, only during their respective operative intervals. The invention also includes means for preventing power dissipation when a power package such as a battery is fitted into the camera with a wrong polarity connection and for protecting the electronic circuit.

6 Claims, 6 Drawing Figures

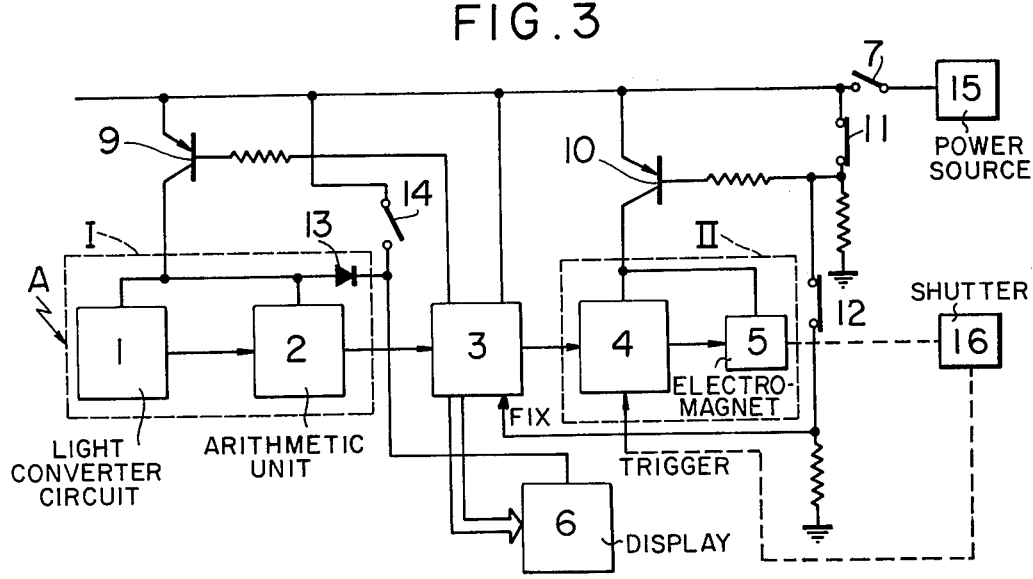
FIG.3
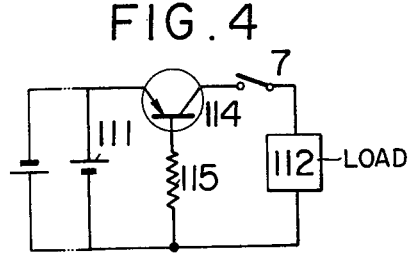
FIG.4
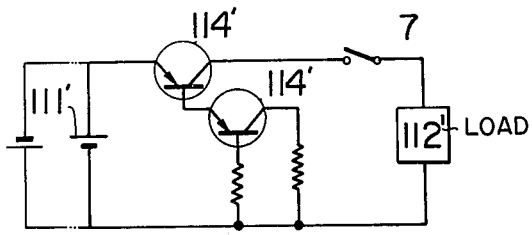
FIG.5(a)
FIG.5(b)

POWER SUPPLY REGULATOR FOR AN AUTOMATIC EXPOSURE ADJUSTING CIRCUIT FOR USE IN A CAMERA

BACKGROUND OF THE INVENTION

The invention relates to an automatic exposure adjusting circuit for use in a camera which enables a saving in the power dissipation.

SUMMARY OF THE INVENTION

It is a principal object of the invention to provide an automatic exposure adjusting circuit for use in a camera which permits the power to be supplied to a plurality of groups of circuits having either different operation initiating or terminating times or both, only during their respective operative intervals.

It is another object of the invention to provide means for preventing a power dissipation and providing a protection for the electric circuit in the event a power package such as a battery is fitted into the camera with a wrong polarity connection.

BRIEF DESCRIPTION OF THE DRAWINGS

Other objects and advantages and features of the invention will become apparent from the following description with reference to the attached drawings, wherein:

FIG. 3 is a block diagram of the automatic exposure adjusting circuit according to another embodiment of the invention;

FIG. 4 is a circuit diagram of the protective circuit according to the invention; and FIG. 5 is a circuit diagram of a modification of FIG. 4.

DETAILED DESCRIPTION OF EMBODIMENTS

Figure 1:
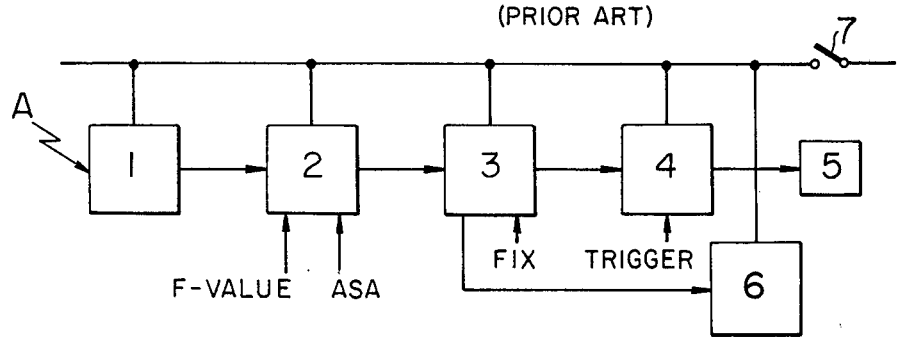
FIG. 1 is a block diagram of a conventional automatic exposure adjusting circuit.

A general arrangement of an automatic exposure adjusting circuit for use in a camera such as of the single lens reflex type and including a memory circuit and a display circuit is illustrated in FIG. 1, wherein the block indicated by a numeral 1 represents a converter circuit for converting the amount of light A from an object being photographed into a voltage; the block 2 represents an arithmetic unit for permitting adjustment in accordance with F- and ASA-values; the block 3 represents a memory circuit for storing an exposure value which has been determined by the circuits 1 and 2; the block 4 represents a circuit for converting the exposure value into a time constant; the block 5 represents an electromagnetic element such as an electromagnet for operating a shutter in response to a signal from the time constant circuit 4; the block 6 represents a circuit for displaying the exposure value in response to a signal from the memory circuit 3; and 7 represents a power switch. With the above arrangement, the closure of the power switch 7 supplies power to all of the circuits 1 to 6 which together constitute an automatic exposure adjusting circuit, both before and after taking a picture, thus disadvantageously causing an exhaustion of a battery, which usually comprises the power source, within a short period of time. This tendency is increased where the storage is manually fixed over a prolonged period of time.

Considering the operation of the automatic exposure adjusting circuit as mentioned above more specifically, it is noted that the circuits 1, 2 and 6 are in use during the time interval from the turning-on to the completion of the photometry until the exposure value is determined, by storing the output of circuit 2 in memory circuit 3 until a predetermined end-of-photometry or fix signal is generated to cut off the storage. The memory circuit 3 operates during storage, and after the movable mirror associated with the finder is moved up to start the first blind of the shutter, and generates a trigger signal which causes the circuits 4 and 5 to operate. During the latter operation the circuits 1, 2 and 6 remain quiescent. As a consequence, the power dissipation can be minimized while assuring a satisfactory photographing operation by interrupting the supply of power to quiescent circuits when other operative circuits are fed with power.

In accordance with the invention, the automatic exposure adjusting circuit for use in a camera comprises a plurality of groups of circuits which are grouped depending on the operational phases and which are connected with a power source through a switching element, to which a coincident signal in response to, or a portion of, an end-of-photometry or storage fixing signal applied to the memory circuit, is applied to supply or interrupt the current to the respective groups of circuits, thus achieving a saving in the power dissipation of the overall circuit.

Figure 2:
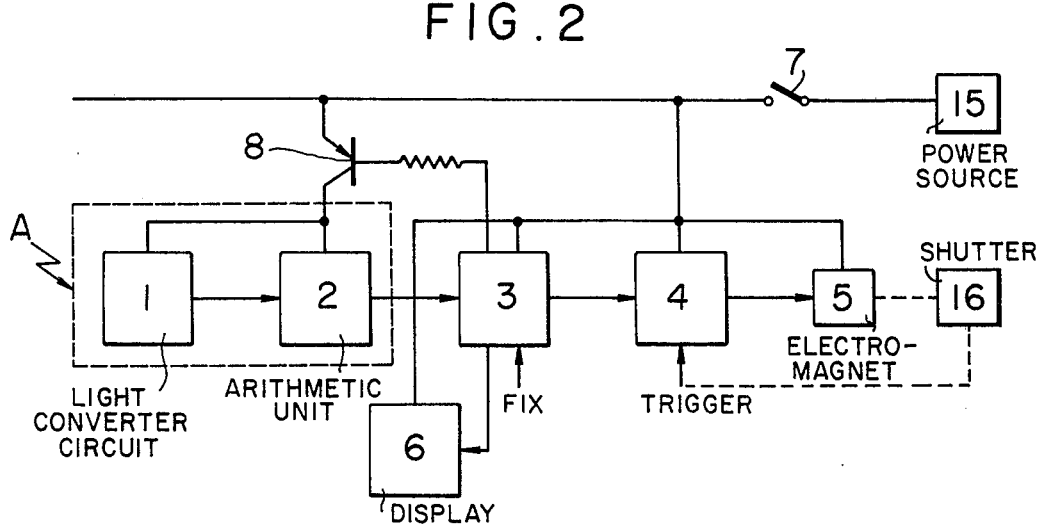
FIG. 2 is a block diagram of the automatic exposure adjusting circuit according to one embodiment of the invention.

FIG. 2 shows the automatic exposure adjusting circuit incorporating the invention. Numerals 1 to 6 represent the same circuits as described in connection with FIG. 1, and the conversion circuit 1 and the arithmetic unit 2 constitute together a first group of circuits while the memory circuit 3, time constant circuit 4, electromagnetic element 5 and display circuit 6 constitute together a second group of circuits. A transistor 8 operating as a switching element is connected between the first group of circuits and a power source 15, and the signal, coincident with the storage fixing signal, from the memory circuit 3 is applied to the base of the transistor 8, which is normally conducting, but is turned off when the coincident signal is applied.

With the above circuit arrangement of the invention, when an exposure value is determined by the first group of the circuits and its storage fixed so that a shutter 16 is prepared to operate, the transistor 8 will be supplied with the coincident signal from the memory circuit 3 to be turned off, thereby interrupting the current supply to the circuits 1 and 2 without any adverse influence upon the operation of the shutter 16. In the present example, the current supply is maintained to the second group of circuits, so that the exposure factors can be confirmed any time by viewing a display provided by the display circuit 6. However, the current dissipation can be further reduced by using a digital storage with C-MOS for the circuit 3 and using a liquid crystal for the display by the display circuit 6. In this instance, the power dissipation can be maintained as low as several microwatts even though the storage is fixed over a prolonged period of time.

A second embodiment of the invention is illustrated in FIG. 3 wherein the circuits 1 to 6 remain the same as in the first embodiment. The conversion circuit 1 and the arithmetic unit 2 form a first group of circuits I, while the time constant circuit 4 and the electromagnetic element 5 form a second group of the circuits II. A transistor 9 operating as a switching element is connected between the power source and the first group of circuits I and the display circuit 6 so as to be maintained normally on and to be turned off when a signal coincident with a storage fixing signal is applied to its base.

On the other hand, another transistor 10 also operating as a switching element is connected between the second group of circuits II and the power source 15 so as to interrupt the connection therebetween normally. However, a normally closed switch 11 which is turned off when the movable mirror (not shown) associated with the signal lens reflex camera moves up is connected with the base of the transistor 10 to turn on the transistor 10 when the switch 11 is turned off, thereby supplying the current to the second group of circuits II for its operation. The numeral 7 represents a power switch as before while numeral 12 represents a manually operated storage fixing switch which normally remains on but is turned off during the storage fixing.

In operation, when the switch 12 is turned off for the purpose of a storage fixing, the transistor 9 is turned off, thereby interrupting the current supply to the first group of circuits I and the display circuit 6. As the movable mirror moves up to turn off the switch 11, the transistor 10 is turned on, thereby initiating the operation of the second group of circuits II by supplying the current thereto. At the same time with the start of running of the first blind of the shutter 16, a trigger signal is applied to the time constant circuit 4 for the purpose of counting the exposure period. When the shutter operation is terminated and the movable mirror moves down, the switch 11 is turned on again, thereby turning off the transistor 10 to interrupt the current supply to the second group of circuits II. By turning on the storage fixing switch 12, the transistor 9 is turned on, supplying the current to the first group of circuits I and the display circuit 6.

As will be noted in this Figure a diode 13 may be connected between the first group of circuits I and the display circuit 6 and the latter connected through a switch 14 with the power source to permit a display by the display circuit 6 to be viewed any time subsequent to the turning off of the transistor 9, by turning on the switch 14.

The invention also contemplates preventing a power dissipation or adverse influences upon the electronic circuit when the battery is connected with a wrong polarity. FIG. 4 shows such an embodiment, and in this Figure, numeral 111 represents a power source, 112 a load which all inclusively represents various circuits having appeared in each preceding embodiment, 114 a transistor having its emitter and collector path connected in series between the positive polarity terminal of the power source 111 and the load 112, and 115 a protective resistor connected with the base of the transistor 114 in shunt with the power source 111 and the load 112. The load 112 represents either of the circuits shown in FIG. 2 or FIG. 3.

In operation, when the power source 111 is connected with a correct polarity as shown in solid line, the base and emitter path of the transistor 114 is forwardly biased into conduction, thereby supplying a current flow to the load 112. When the power source 111 is connected with a reverse polarity a shown in dotted lines, the collector and base path of the transistor 114 will have zero bias, and its base and emitter path will be reversely biased so that the transistor 114 is turned off, thereby protecting the load 112. In the present arrangement, the voltage drop across the transistor 114 can be reduced to as small a voltage as 0.1 to 0.2 volt by suitably choosing the value of the resistor 115.

In one experiment, the circuit has been constructed with the following parameters:

| | |
|---|---|
| Voltage | 5 volts |
| Transistor | 2 SA733 |
| Resistor | 10 kiloohms |
| Load | 150 ohms |
| Forward voltage drop during normal use | 0.15 volt |
| Reverse current when connected with a wrong polarity | less than 0.1 microampere |

In the present example, the full voltage will be applied across the base and emitter of the transistor 14 when the power source is connected with a wrong polarity, so that the circuit shown cannot be used as a protective circuit when employing a power source 111 having a voltage magnitude comparable to the reverse withstand voltage across the base and emitter of the transistor 114, which is normally on the order of 5 to 7 volts.

A plurality of transistors 114' connected in a Darlington circuit with respect to the power source 111' and load 114' as shown in FIGS. 5(a) and (b) may be used to provide an increased load current, using a power source having a voltage in excess of that which can be used in the first embodiment.

What is claimed is:

1. In a camera having an automatic exposure adjusting system of the type comprising:

shutter means for operating in response to a trigger signal;

first circuit means for sensing incoming light and producing a photometry signal in response thereto;

second circuit means for storing said photometry signal until receipt of an end-of-photometry signal;

third circuit means for receiving said stored photometry signal upon receipt of said trigger signal and for producing an output signal in accordance with said stored photometry signal to end the operation of said shutter means; and a power source for energizing said first, second and third circuit means;

the improvement comprising:

switching means connected between said power source and at least one of said first and third circuit means; and means for controlling said switching means to cut off power from said power source to said at least one of said first and third circuit means in respective response to the occurrence of at least one of said end-of-photometry signal and the end of the operation of said shutter means; and wherein said switching means comprises a transistor having its emitter connected to said power source, its base connected to said controlling means and its collector connected to one of said first and third circuit means.

2. A system as in claim 1 wherein said switching means further comprises a second transistor having its emitter connected to said power source, its base connected to said controlling means and its collector connected to the other of said first and third circuit means.

3. A system as in claim 1 further comprising fourth circuit means for displaying a shutter speed in accordance with said stored photometry signal.

4. A system as in claim 3 further comprising manual switch means for connecting said fourth circuit means with said power source.

5. A system as in claim 1 further comprising a transistor having its emitter and collector path connected in series between one terminal of said power source and said first, second and third circuit means, and resistor means connected between the base of said transistor and the other pole of said power source.

6. A system as in claim 5 further comprising at least one other transistor connected between the base of said transistor and said resistor to form a Darlington circuit.

* * * * *